United States Patent
Gan

(10) Patent No.: US 11,234,202 B1
(45) Date of Patent: Jan. 25, 2022

(54) DOPPLER SHIFT ESTIMATION AND CORRECTION FOR BROADBAND COMMUNICATION IN UNMANNED AERIAL VEHICLES

(71) Applicant: Facebook, Inc., Menlo Park, CA (US)

(72) Inventor: Hong Gan, San Diego, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/931,165

(22) Filed: May 13, 2020

Related U.S. Application Data

(63) Continuation of application No. 15/712,102, filed on Sep. 21, 2017, now Pat. No. 10,687,297, which is a
(Continued)

(51) Int. Cl.
*H04W 56/00* (2009.01)
*H04W 4/02* (2018.01)
(Continued)

(52) U.S. Cl.
CPC ......... *H04W 56/0035* (2013.01); *G01S 5/021* (2013.01); *H04B 1/0475* (2013.01);
(Continued)

(58) Field of Classification Search
CPC ....... B64C 13/16; B64C 39/024; G01S 5/021; G01S 13/58; G01S 13/765; G01S 17/95; G05D 1/0022; G05D 1/105; G08G 5/0013; G08G 5/0056; G08G 5/0069; H03F 1/3247; H03F 3/24; H04B 1/04; H04B 1/0475; H04B 1/1027; H04B 1/525; H04B 7/185;
(Continued)

(56) References Cited

U.S. PATENT DOCUMENTS 5,613,193 A 3/1997 Ishikawa et al.
5,745,072 A 4/1998 Jensen et al.
(Continued)

FOREIGN PATENT DOCUMENTS

JP 2003-309517 A 10/2003

OTHER PUBLICATIONS

Non Final Office Action received for U.S. Appl. No. 14/724,689 dated Dec. 27, 2016, 13 pages.
(Continued)

*Primary Examiner* — Marcos L Torres
(74) *Attorney, Agent, or Firm* — FisherBroyles, LLP

(57) ABSTRACT

Systems and associated methods for reducing Doppler shifts in the broadband signals between Unmanned Aerial Vehicles (UAVs) and ground stations are disclosed herein. In one embodiment, a method for reducing the Doppler shift of wireless signals includes estimating a velocity of the UAV based on a Global Positioning System (GPS) or an Inertial Measurement Unit (IMU) of the UAV and calculating the Doppler shift of an upload (UL) wireless signal based on the velocity of the UAV. The method further includes predistorting a frequency of the UL wireless signal at the ground station to reduce the Doppler shift at a UAV receiver (RX) and transmitting the UL wireless signal from a ground station transmitter (TX) to the UAV RX. In some embodiments, calculating the Doppler shift of the UL wireless signal is performed at the ground station.

20 Claims, 12 Drawing Sheets

Related U.S. Application Data continuation of application No. 14/724,689, filed on May 28, 2015, now Pat. No. 10,015,762.

(51) Int. Cl.
  *H04B 1/04* (2006.01)
  *H04B 7/185* (2006.01)
  *G01S 5/02* (2010.01)
  *H04L 29/08* (2006.01)

(52) U.S. Cl.
  CPC ........ *H04B 7/18504* (2013.01); *H04W 4/027* (2013.01); *H04B 2001/0491* (2013.01); *H04L 67/12* (2013.01)

(58) Field of Classification Search
  CPC ............ H04B 7/18504; H04B 7/18556; H04B 7/208; H04B 7/2125; H04B 2001/0491; H04W 4/027; H04W 16/14; H04W 28/04; H04W 56/0035; H04L 67/12
  See application file for complete search history.

(56) References Cited

U.S. PATENT DOCUMENTS

| | | | |
|---|---|---|---|
| 5,995,039 A | 11/1999 | Jensen et al. | |
| 6,675,013 B1 * | 1/2004 | Gross | H04B 7/18504 455/11.1 |
| 6,861,979 B1 | 3/2005 | Zhodzishsky et al. | |
| 6,965,753 B1 | 11/2005 | Miller et al. | |
| 8,559,895 B2 | 10/2013 | Fernandez-Corbaton et al. | |
| 8,599,956 B1 * | 12/2013 | Mitchell | H04W 56/0035 375/285 |
| 9,802,701 B1 * | 10/2017 | Hawes | G05D 1/0088 |
| 10,015,762 B2 | 7/2018 | Gan | |
| 10,419,100 B2 * | 9/2019 | Hanson | H04L 27/10 |
| 10,687,297 B2 | 6/2020 | Gan | |
| 2002/0173269 A1 | 11/2002 | Grayson et al. | |
| 2005/0232338 A1 * | 10/2005 | Ziedan | G01S 19/29 375/145 |
| 2009/0224099 A1 | 9/2009 | Steele et al. | |
| 2010/0198514 A1 | 8/2010 | Miralles | |
| 2010/0290356 A1 | 11/2010 | Hadad et al. | |
| 2011/0176479 A1 | 7/2011 | Booton et al. | |
| 2011/0238307 A1 | 9/2011 | Psiaki et al. | |
| 2012/0143482 A1 | 6/2012 | Goossen et al. | |
| 2014/0002302 A1 * | 1/2014 | Robinson | H04B 7/1855 342/357.32 |
| 2016/0173162 A1 | 6/2016 | Lundstedt et al. | |
| 2016/0313736 A1 * | 10/2016 | Schultz | G08G 5/0086 |
| 2016/0328980 A1 | 11/2016 | Sharma et al. | |
| 2017/0041895 A1 | 2/2017 | Gan | |

OTHER PUBLICATIONS

Notice of Allowance received for U.S. Appl. No. 14/724,689 dated Jun. 22, 2017, 16 pages.

Non Final Office Action received for U.S. Appl. No. 15/712,102 dated Nov. 2, 2018, 25 pages.

Final Office Action received for U.S. Appl. No. 15/712,102 dated Nov. 15, 2019, 19 pages.

Notice of Allowance received for U.S. Appl. No. 15/712,102 dated Feb. 10, 2020, 24 pages.

U.S. Appl. No. 14/724,689 for Gan, H. filed May 28, 2015.

* cited by examiner

DOPPLER SHIFT ESTIMATION AND CORRECTION FOR BROADBAND COMMUNICATION IN UNMANNED AERIAL VEHICLES

CROSS REFERENCE TO RELATED APPLICATION

This application is a continuation of U.S. application Ser. No. 15/712,102, filed 21 Sep. 2017, which is a continuation of U.S. application Ser. No. 14/724,689, filed 28 May 2015, the disclosures of which are incorporated, in their entirety, by this reference.

TECHNICAL FIELD

The present technology is generally related to the field of correcting Doppler shifts in the broadband signals between Unmanned Aerial Vehicles (UAVs) and ground stations.

BACKGROUND

Wireless communication systems transfer data from a transmitter (TX) of one station to a receiver (RX) of another station. In some applications, one of the stations can be ground based (i.e., stationary) while the other station is carried by a flying object (e.g., a satellite in Earth's orbit or an airplane). In some applications, multiple stations (TX or RX) can be ground based and in communication with one or more flying objects (RX or TX). Such systems are sometimes used for Internet connections, especially if the land-based network is underdeveloped. A relative distance between the TX and RX changes in real time, depending on the direction and magnitude of the velocity of the flying object. As a result, the Doppler shift distorts the signal transmitted/received between the TX and RX. The Doppler frequency shift can be estimated as:

$$f_D = f_t - f_r,$$

where $f_t$ represents frequency of the signal at TX, and $f_r$ represents frequency of the signal at RX. The Doppler frequency shift can be calculated as:

$$f_D = \frac{f}{c}(\vec{V}_t - \vec{V}_r) \cdot \vec{n},$$

where $\vec{V}_t$ and $\vec{V}_r$ represent velocities of TX and RX, respectively, $\vec{n}$ represents unity vector in the line of TX and RX, and "c" represents the speed of light.

In practice, if an airplane TX transmits a wireless signal while traveling away from the ground station, the frequency of the signal sensed by the ground station RX is lower than the frequency of the wireless signal originally transmitted by the airplane's TX. Conversely, it for example, the airplane receives the wireless signal while travelling toward the ground station, the frequency of the signal sensed by the airplane's RX is higher than the frequency of the wireless signal originally transmitted from the ground station's TX. This mismatch in the TX/RX frequencies of the wireless signals can result in an increased bit error ratio (BER) of the digital signal (i.e., number of the error bits divided by the total number of bits in the signal) reduced from the received wireless signal at the RX, which reduces the effective bandwidth of the wireless signal.

Several conventional methods can counteract the mismatch between the TX and RX frequencies caused by the Doppler shift. For example, when the trajectory of the flying object is known a-priori (e.g., a commercial airplane on a scheduled route), the Doppler shift at the ground station can be calculated. Based on this predetermined Doppler shift, the wireless signal at, for example, airplane TX, can be predistorted through analogue circuitry such that the frequency shift of the wireless signal received by the ground station RX is eliminated or reduced. In other conventional systems, the a-priori known Doppler shift can be fed to appropriate electronic circuitry at the RX to correct the frequency of the signal received by the RX. The electronic circuitry required for the correction/predistortion can be either stored at the ground station or carried by the relatively large flying object (e.g., the satellite or airplane). With some other conventional systems, the flying object transmits a reference signal at known frequency in addition to the data-carrying wireless signal. The difference between the frequency of the reference signal as received by the RX and the a-priori known value of the emitted reference signal corresponds to the Doppler frequency shift. Since the wireless signal received by the RX is also subjected to the same Doppler shift, the wireless signal can be corrected using, for example, suitable electronic circuitry.

In some applications, however, the trajectory of the flying object is not known a-priori and/or the reference signals may not be practical because the bandwidth required for the reference signal reduces the bandwidth available for the wireless data transmission. Accordingly, it would be advantageous to provide a robust correction for wireless signal Doppler shift that does not depend on the a-priori knowledge of the trajectory of the flying object or on the reference signals.

DETAILED DESCRIPTION

Figure 1A:
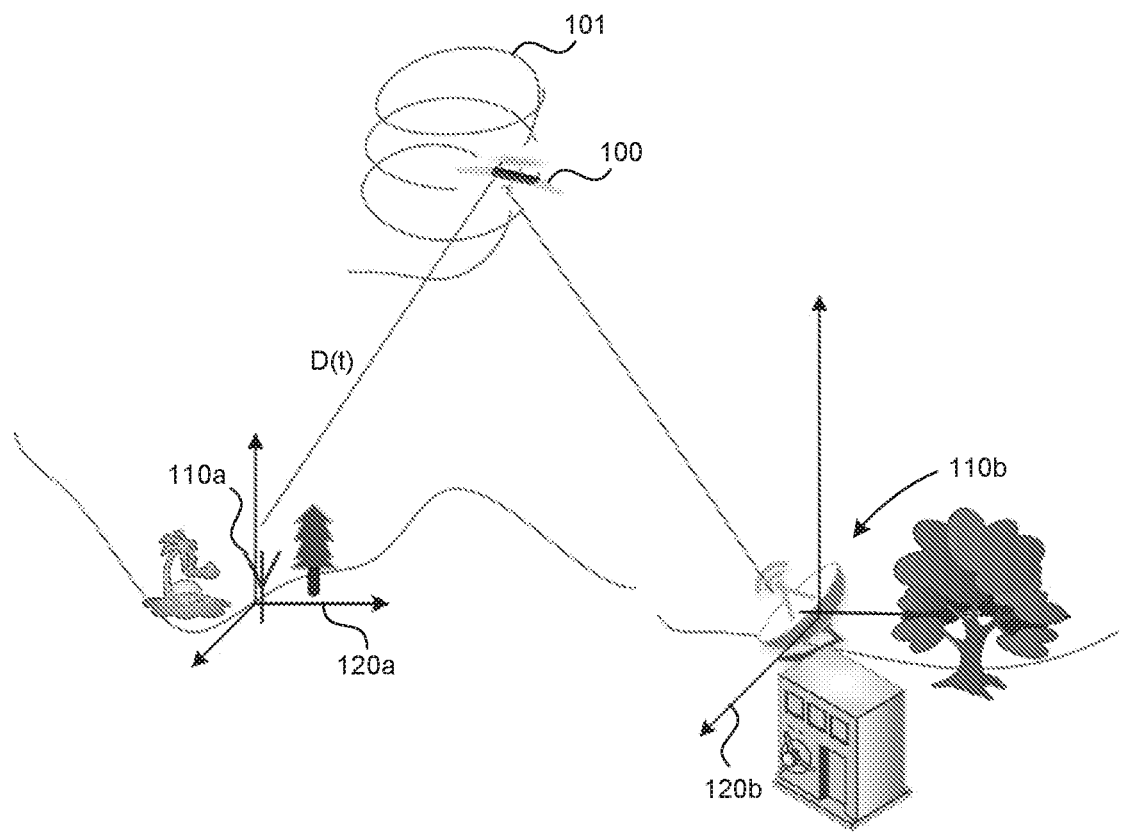
FIG. 1A is a schematic representation of a position of an unmanned aerial vehicle (UAV) with respect to a ground station.

The following disclosure describes various embodiments of systems and associated methods for correcting the Doppler shift of the wireless signal between a ground station and an unmanned aerial vehicle (UAV). In some embodiments, a broadband communication via High Altitude Long Endurance (HALE) UAV is capable of achieving low cost/high throughput wireless communication. The UAV based broadband communication can be especially useful in the areas where land based fiber networks are underdeveloped. However, the Doppler shift changes the frequency of the wireless signals due to the velocity of the UAV relative to the ground station. In general, the Doppler shift caused by the velocity of the UAV is not known a-priori because of the complex and changing trajectory of the UAV. In some embodiments of the present technology, the Doppler shift can be evaluated by calculating velocity of the UAV using a GPS (and/or other motion sensors) carried by the UAV. Based on thus calculated real time Doppler shift, the download (DL) signal received at the ground station RX can be corrected to eliminate or reduce its Doppler shift. In general, the corrected signal has a smaller bit error ratio (BER) than the originally received signal that includes the Doppler shift. The corrected signal can then be demodulated into its constitutive channels and provided to the users. In some embodiments, based on the estimated Doppler shift, the upload signal (UL) at the ground station TX can be predistorted such that the effects of the Doppler shift are eliminated or at least reduced when the signal is received at the UAV RX.

In addition to or instead of the correction/predistortion at the ground station, the signal correction and/or predistortion can be done at the UAV RX/TX using the electronics carried by the UAV. For example, the outgoing DL signal can be predistorted at the UAV TX, while the outgoing upload (UL) signal can be predistorted at the ground station TX. Furthermore, the signals can be corrected at the corresponding ground station/UAV RX's. Since the weight and size of the correction/predistortion electronics reduces the flight time and/or payload of the UAV, in some embodiments a coarse correction/predistortion can be delegated to the ground station, while the fine (or perturbation) correction/predistortion is performed by a suitable electronics carried by the UAV (for example, digital signal processing (DSP) electronics). In general, suitable correction/predistortion of the wireless signal can be applied before and/or after the signal is digitized.

The calculated values of the Doppler shift may lag behind the real-time Doppler shift because of (a) the travel time for the UAV position/velocity data to reach the computers at the ground station; and (b) the computational effort to calculate the Doppler shift. Therefore, in some embodiments, the UAV flight (e.g., trajectory, velocity) can be dynamically characterized (for example, based on the GPS and other flight sensors carried by the UAV) to proactively predict the Doppler shift of the wireless signal in real time or at least closer to real time. Then, the predicted Doppler shift can be used to correct/predistort the wireless signal.

Various embodiments of the inventive technology are set forth in the following description and FIGS. 1A-8, The word "module" is used to describe hardware, software or a combination of hardware and software that executes the computing/control tasks in the system. Some examples of the hardware are programmable processors, application specific integrated circuits (ASICs), digital signal processors (DSPs) and the like. The software may include a sequence of instructions that can be executed by the hardware. Many of the details and features shown in the Figures are merely illustrative of particular embodiments of the disclosure and may not be drawn to scale. Accordingly, other embodiments can have other details and features without departing from the spirit and scope of the present disclosure. In addition, those of ordinary skill in the art will understand that further embodiments can be practiced without several of the details described below. Some details describing well-known structures and systems often associated with wireless signal systems are not set forth below to avoid unnecessarily obscuring the description of the various embodiments of the disclosure. Furthermore, various embodiments of the disclosure can include structures other than those illustrated in the Figures and are expressly not limited to the structures shown in the Figures.

FIG. 1A is a schematic view of a trajectory 101 of a UAV 100 with respect to a ground stations 110*a*, 110*b*. The trajectory 101 may appear erratic to a hypothetical observer at the ground station 200 because of the frequent changes in the velocity direction and magnitude of the UAV 100 with respect to fixed frames of reference 120*a* (at the ground station 110*a*) and 120*b* (at the ground station 110*b*). These changes in the velocity and location of the UAV 100 cause the corresponding Doppler shifts in frequency and timing of the signals received by the RX's of the ground stations 110*a*, 110*b* and the UAV 100. In general, the trajectory of the UAV is not known a-priori. Therefore, the corresponding shifts in the frequency and timing of the wireless signals are also not known a-priori.

Figure 1B:
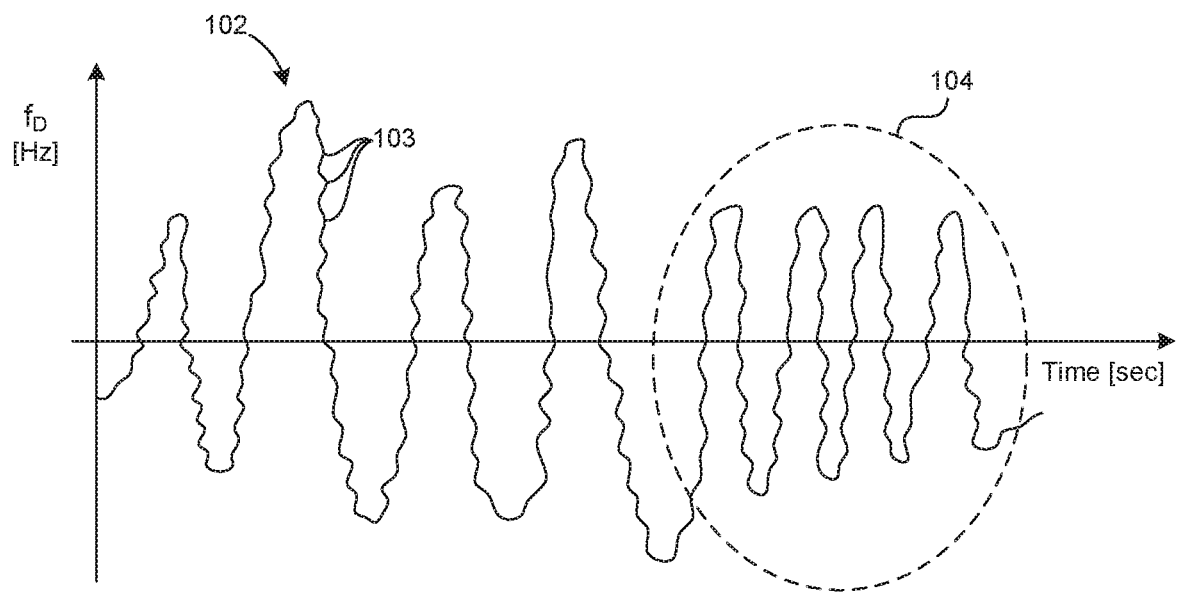
FIG. 1B is a graph of a Doppler frequency as a function of time.

FIG. 1B is a graph of a sample Doppler frequency shift sensed by the RX (either UAV based or ground station based) as a function of time. The vertical axis represents Doppler frequency shift in Hz, and the horizontal axis represents time. The illustrated Doppler frequency shift has a basic (coarse) shape 102 with the interposed (fine) perturbations 103 that may be caused by, for example, vibration and/or rotation of the UAV. In general, the perturbations of the UAV are relatively small in comparison to the changes in the overall trajectory of the UAV. Due to a smaller amplitude of the perturbations 103 in comparison to the basic (coarse) shape 102, the perturbations appear superimposed over the basic shape 102 of the Doppler frequency shift. In some embodiments, the amplitude of the perturbations 103 may be an order of magnitude smaller than the amplitude of the basic shape 102. In general, a higher amplitude of the basic shape 102 corresponds to the faster speed of the UAV (either moving away or toward the RX). Conversely, a higher amplitude of the perturbations 103 that is superimposed over the basic shape 102 corresponds, for example, to a larger amplitude of the vibration of the UAV. In the right hand side of the graph, a group of waveforms 104 has a generally higher frequency than the remainder of the Doppler frequency shift 102. Such a higher frequency may be indicative of the UAV changing its direction toward/away from the ground station more frequently. If left uncorrected; this higher frequency caused by the Doppler shift may result in a higher bit error ratio (BER) when the signal is received at the RX and/or smaller bandwidth of the wireless signal.

Figure 2:
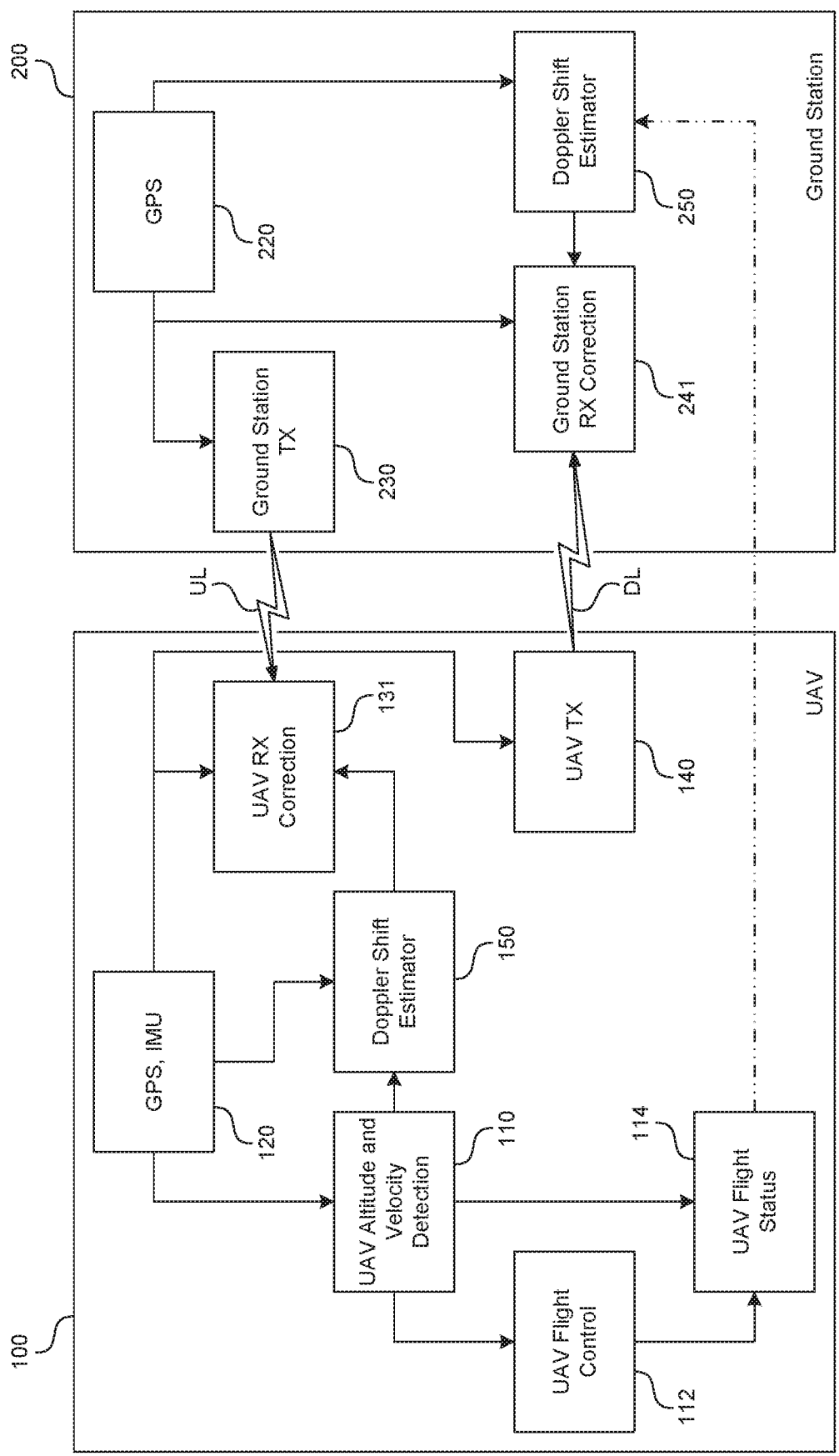
FIG. 2 is a schematic illustration of a system for signal correction at the ground station and UAV RX's in accordance with an embodiment of the present technology.

FIG. 2 is a schematic illustration of a system for signal correction at the RX's of the UAV 100 and ground station 200. In some embodiments, the UAV 100 can carry one or more GPS's and/or inertial measurement units (IMU's) 120 capable of determining a position of the UAV in real time. In some embodiments, the IMU's can be accelerometers or gyroscopes. Generally, the accuracy of determining the position of the UAV improves with the number of the GPS's, IMU's and the altitude of the UAV. In the illustrated embodiment, the output of the GPS, IMU 120 is fed to a UAV Altitude and Velocity Detection module 110. A person of ordinary skill would know suitable electronics and software that can estimate altitude and velocity of a UAV based on the GPS signal of the UAV. For example, a first derivative of the GPS (and/or IMU) signal as a function of time can be an estimate of the velocity of the UAV. As explained above, the velocity of the UAV 100 causes the Doppler shift in the frequency of the wireless signal received at the ground station RX. Furthermore, the location of the UAV 100 (i.e., the distance from the UAV to the ground station) determines the time required for the wireless signal to travel from the UAV 100 to the ground station 200 (i.e., a timing difference). A Doppler Shift Estimator module 150 can estimate the frequency and timing shifts of the wireless signal based in part on the output of the UAV Altitude and Velocity Detection module 110. In general, the UL wireless signal received by the UAV RX includes a frequency shift caused by the Doppler effect. In at least some embodiments of the inventive technology, based on the calculations by the UAV Altitude and Velocity Detection module 110, a UAV RX Correction module 131 can eliminate or at least reduce the frequency/timing shifts of the UL wireless signal at the UAV RX. After the correction, the UL wireless signal received at the UAV RX can have a reduced BER and/or an improved bandwidth.

A UAV Flight Control module 112 can maintain the altitude and velocity of the UAV based at least in part on the UAV Altitude and Velocity Detection module 110. For example, the UAV Flight Control module 112 can maintain the position of the UAV at a prescribed altitude and within a generally defined area by controlling the magnitude and direction of the velocity of the UAV 100. In some embodiments, a UAV Flight Status module 114 can report the location, velocity and/or acceleration of the UAV to the ground station 200. Based on the reports received from the UAV Flight Status module 114 and signal from a GPS 220 of the ground station 200, a Doppler Shift Estimator module 250 of the ground station 200 can estimate the Doppler shift of the wireless signal received at the ground station RX. A person of ordinary skill would know suitable methods and systems for estimating a Doppler shift of the wireless signal based on the velocity of the UAV 100, distance of the UAV 100 from the ground station 200, and frequency of the wireless signal. Based on the estimate of the Doppler shift, a Ground Station RX Correction module 241 can process the incoming wireless signal to eliminate or reduce the effects of frequency/timing shifts of the DL wireless signal received at the ground station RX.

Performing the Doppler shift correction of the UL wireless signal at the UAV has both advantages and drawbacks. An example of an advantage are the readily available UAV altitude and velocity reports that can be input to the Doppler Shift Estimator module 150 without appreciable delays caused by the signal travel among the relatively closely spaced components of the UAV. However, the weight and space of the Doppler Shift Estimator module 150 and UAV RX Correction module 131 may limit the payload and/or flight time of the UAV. Conversely, when the Doppler shift correction is performed at the ground station 200 (e.g., at the Ground Station RX Correction module 241), the weight/space limitations are less restrictive, but the time required for the, for example, transmission of the UAV flight status reports from the UAV 100 to the ground station 200 necessarily delays the implementation of the DL wireless signal correction. Therefore, different distributions of the correction/predistortion hardware are suitable for different situations.

Figure 3:
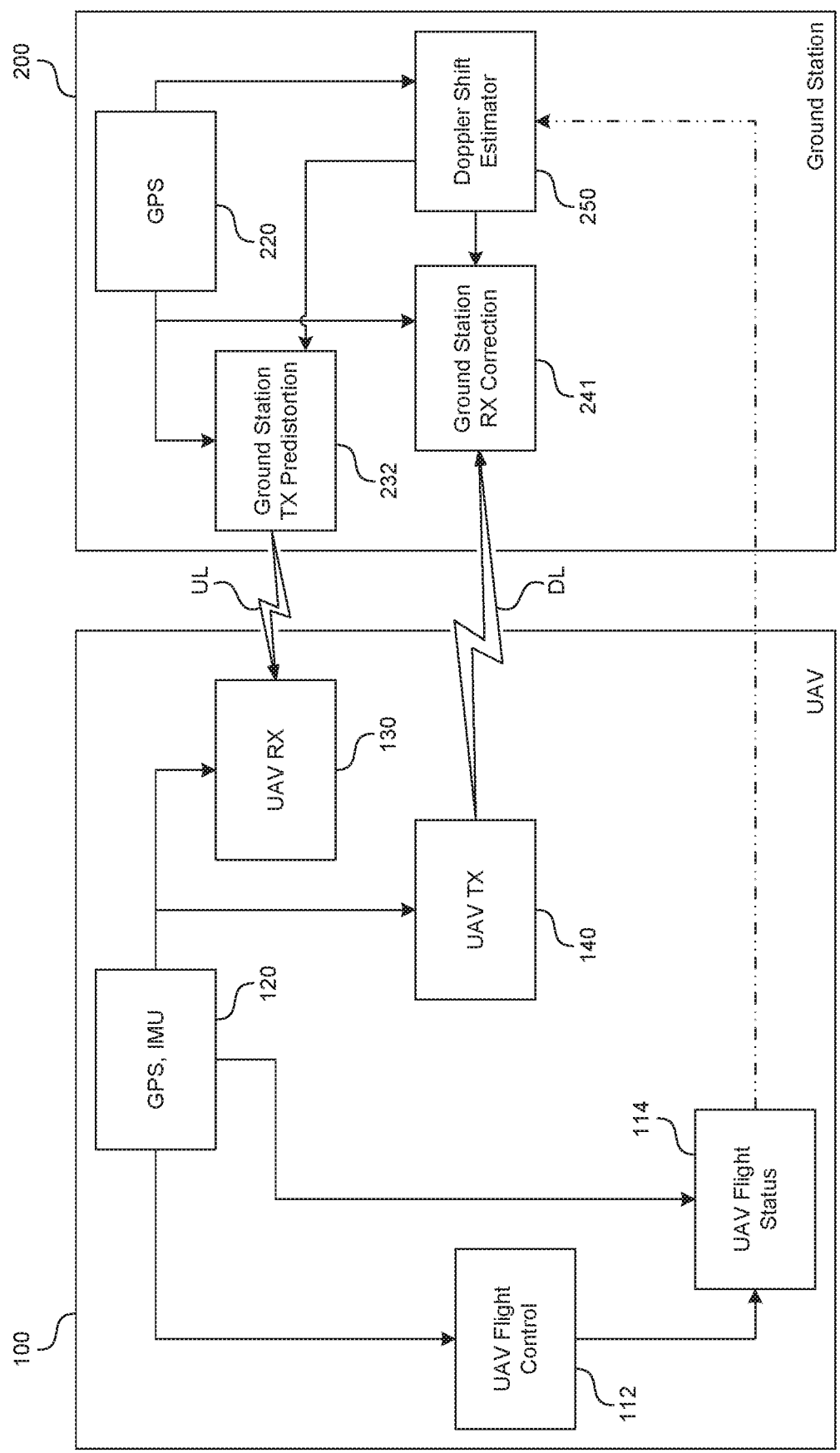
FIG. 3 is a schematic illustration of a system for signal predistortion at the ground station TX and a signal correction at the ground station RX in accordance with an embodiment of the present technology.

FIG. 3 is a schematic illustration of a system for signal predistortion at the ground station TX and a signal correction at the ground station RX in accordance with an embodiment of the present technology. As explained with reference to FIG. 2 above, the weight and space of the components required for UAV based RX correction may limit the payload and/or flight time of the UAV. Therefore, in at least some embodiments of the present technology, the ground station 200 can include electronics and software both for correcting the DL wireless signal and for predistorting the UL wireless signal. With the illustrated embodiment, the Doppler Shift Estimator module 250 receives the status reports from the UAV 100 (e.g., position, velocity, acceleration of the UAV) and the output of the ground station based GPS, IMU 220. Based on the received data, the Doppler Shift Estimator module 250 can estimate required correction and predistortion, and provide it to the Ground Station RX Correction module 241 and a Ground Station TX Predistortion module 232, respectively. Based on the input from the Doppler Shift Estimator module 250, the Ground Station RX Correction module 241 can correct the incoming DL wireless signal to eliminate or reduce the BER and/or to improve the bandwidth of the wireless signal. Furthermore, the Ground Station TX Predistortion module 232 can predistort the outgoing UL wireless signal by, for example, adjusting the frequency of the UL wireless signal such that the wireless signal received at the UAV RX has the frequency/timing that is representative of small or non-existent Doppler shifts. For example, if the UAV 100 moves away from the ground station 200 then the Ground Station TX Predistortion module 232 may increase the frequency of the UL wireless signal to offset the effects of the Doppler shift associated with the UAV velocity. In some embodiments, the precision of the Doppler shift elimination/reduction can be further improved by correcting/predistorting the wireless signal at the ground station 200 and UAV 100. An example of such a system is described below with reference to FIG. 4.

Figure 4:
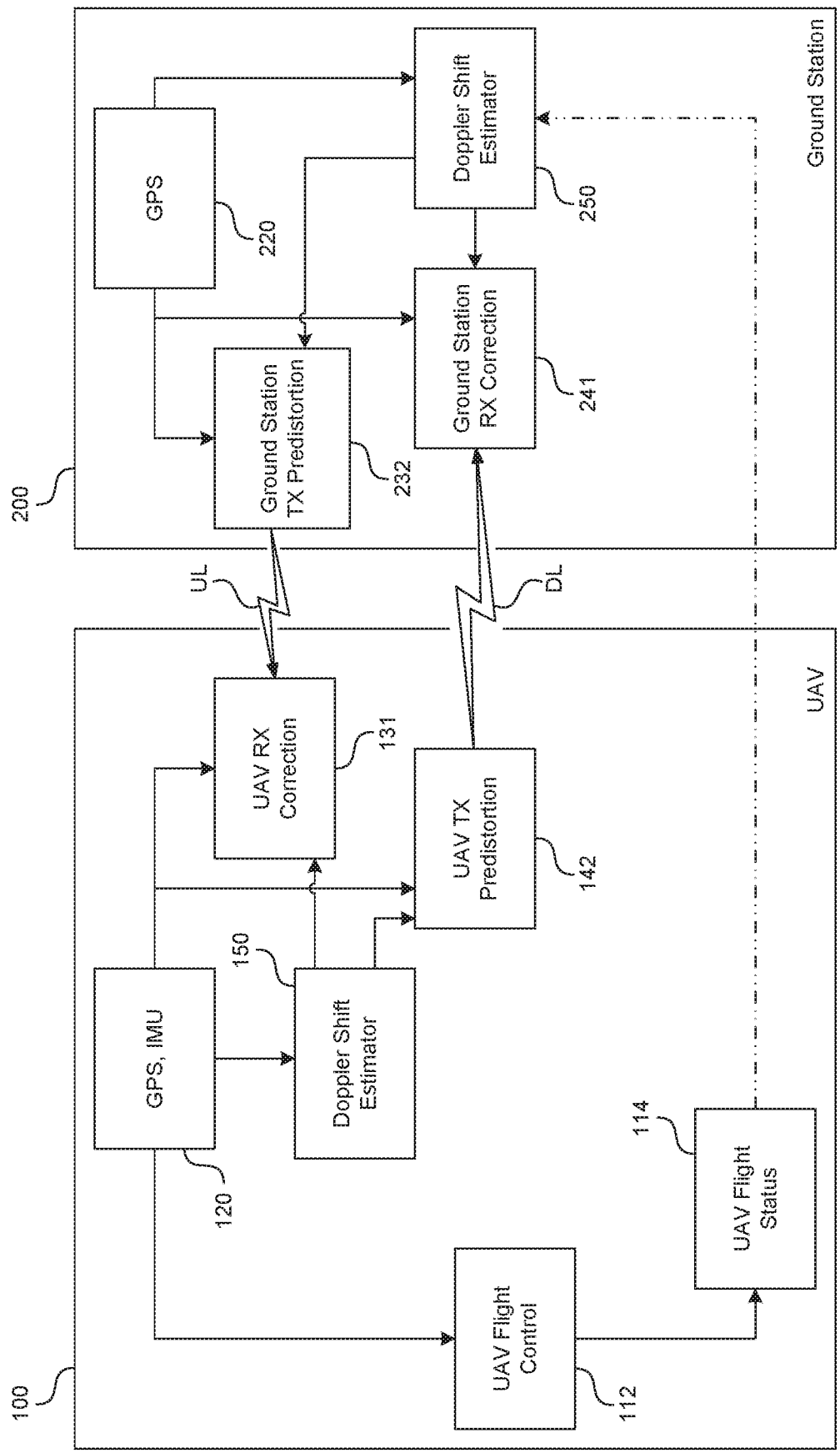
FIG. 4 is a schematic illustration of a system for the signal predistortion and correction at both the ground station and UAV in accordance with an embodiment of the present technology.

FIG. 4 is a schematic illustration of a system for the signal predistortion and correction at both the ground station and UAV in accordance with an embodiment of the present technology. With the illustrated embodiment, the DL wireless signal can be predistorted at the UAV TX Predistortion module 142 to eliminate or reduce the effects of the Doppler shift at the ground station RX. The remaining effects of the Doppler shift (if any) in the predistorted DL wireless signal can be eliminated/reduced at the Ground Station RX Correction module 241. Conversely, the UL wireless signal can be predistorted at the Ground Station TX Predistortion module 232, and then further corrected at the UAV RX Correction module 131. In at least some embodiments of the present technology, the effects of the Doppler shifts are eliminated or reduced more thoroughly using both the predistortion and correction.

Figure 5:
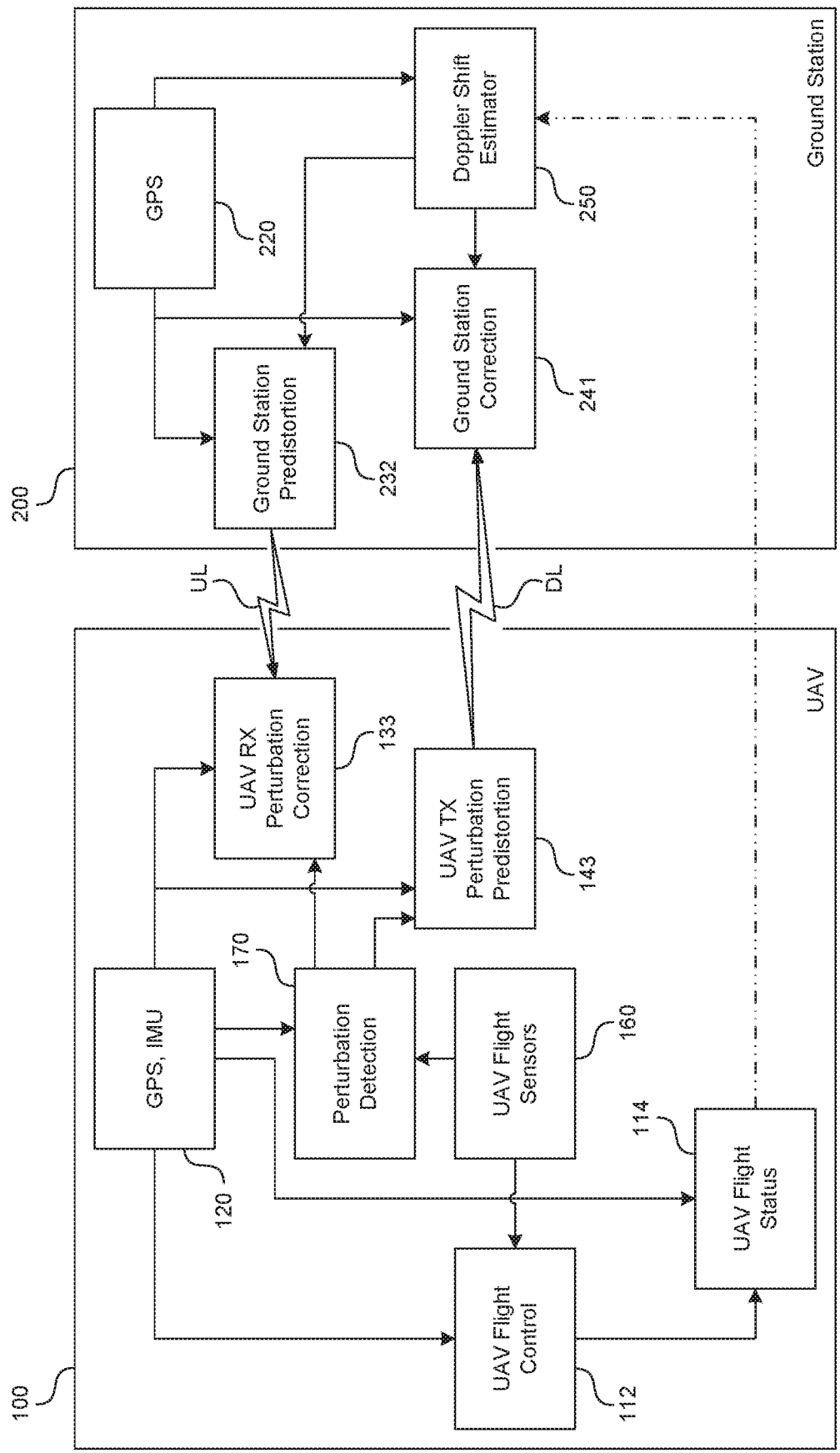
FIG. 5 is a schematic illustration of a system for the signal correction/predistortion at the ground station and the perturbation correction/predistortion at the UAV in accordance with an embodiment of the present technology.

FIG. 5 is a schematic illustration of a system for the signal correction/predistortion at the ground station and the perturbation correction/predistortion at the UAV in accordance with an embodiment of the present technology. With the illustrated embodiment, the wireless signal is corrected/predistorted both at the ground station 200 and the UAV 100. Specifically, a coarse correction/predistortion is performed at the ground station 200, while a perturbation correction/predistortion is performed at the UAV 100. In at least some embodiments, such a distribution of the wireless signal correction/predistortion between the ground station and the UAV can decrease the BER of the resulting data reduced from a received wireless signal, while minimizing the weight/space required for the correction/predistortion modules. As explained with reference to FIG. 1B, the Doppler shift can have a basic (coarse) shape with the interposed (fine) perturbations caused by, for example, vibration and/or rotation of the UAV, which can be measured by Flight Sensors 160 (e.g., accelerometers, gyroscopes). The outputs of the Flight Sensors 160 and the GPS, IMU 120 can be directed to a Perturbation Detection module 170 that includes suitable electronics and/or software for quantifying the perturbations of the UAV. In some embodiments, the perturbations can be differentiated from the basic Doppler frequency shift based on the amplitudes of the perturbation being significantly smaller (e.g., an order of magnitude smaller or two orders of magnitude smaller) than the Doppler frequency shift. The amplitude differences can be detected by suitable electronics, for example level detectors. In other embodiments, the perturbations can be differentiated from the Doppler frequency shift based on the frequency of the perturbations being different (e.g., smaller or larger) than the Doppler frequency shift. The frequency differences can be detected by, for example, applying Fourier transform to the time series and detecting peak power density at different frequencies: Doppler frequency shift and the perturbation frequency. In some embodiment of the present technology, the required signal processing is performed by dedicated digital or analog signal processing electronics. Based at least in part on this quantification (i.e., quantification of the perturbations), a UAV RX Perturbation Correction module 133 can eliminate or reduce the perturbations of the incoming UL wireless signal. Analogously, a UAV TX Perturbation Predistortion module 143 can eliminate or reduce the perturbations of the outgoing DL wireless signal. With the illustrated embodiment, the required electronics for the perturbation correction/predistortion is carried by the UAV. Therefore, the time delays for the signals that quantify the perturbations are generally small (in comparison with the time delays associated with the travel of the wireless signal to/from the ground station), which can improve the correction/predistortion of the perturbations. In at least some embodiments, the Ground Station TX Predistortion module 232 and Ground Station RX Correction module 241 can respectively predistort/correct the wireless signal to eliminate or reduce the coarse Doppler shift of the wireless signal. As explained with reference to FIG. 1B, in some embodiments, the perturbations in the Doppler frequency (or timing) shifts can have substantially higher frequency and smaller amplitude in comparison with the coarse Doppler frequency/timing shifts. In general, the correction of the Doppler frequency/timing shifts at the RX may introduce errors or noise due to, for example, the errors in calculating signal travel delays between the TX and RX.

Such errors/noise may be relatively less significant for the coarse Doppler shifts due to their relatively high amplitudes. Conversely, the errors/noise caused by the correction of the perturbation frequency/timing shifts may be relatively more significant due to the relatively small amplitudes of the perturbations in the Doppler shifts. Therefore, in at least some embodiments, the DL wireless signal may be appropriately predistorted by the UAV TX Perturbation Predistortion module 143, while the Ground Station RX Correction module 241 can correct the wireless signal to eliminate or reduce the coarse Doppler shift of the wireless signal. Analogously, the UL wireless signal may be appropriately predistorted by the Ground Station Predistortion module 232 to reduce/eliminate the coarse Doppler shifts, while the perturbations in the UL wireless signal are reduced/eliminated by the UAV RX Perturbation Correction module 133.

Figure 6:
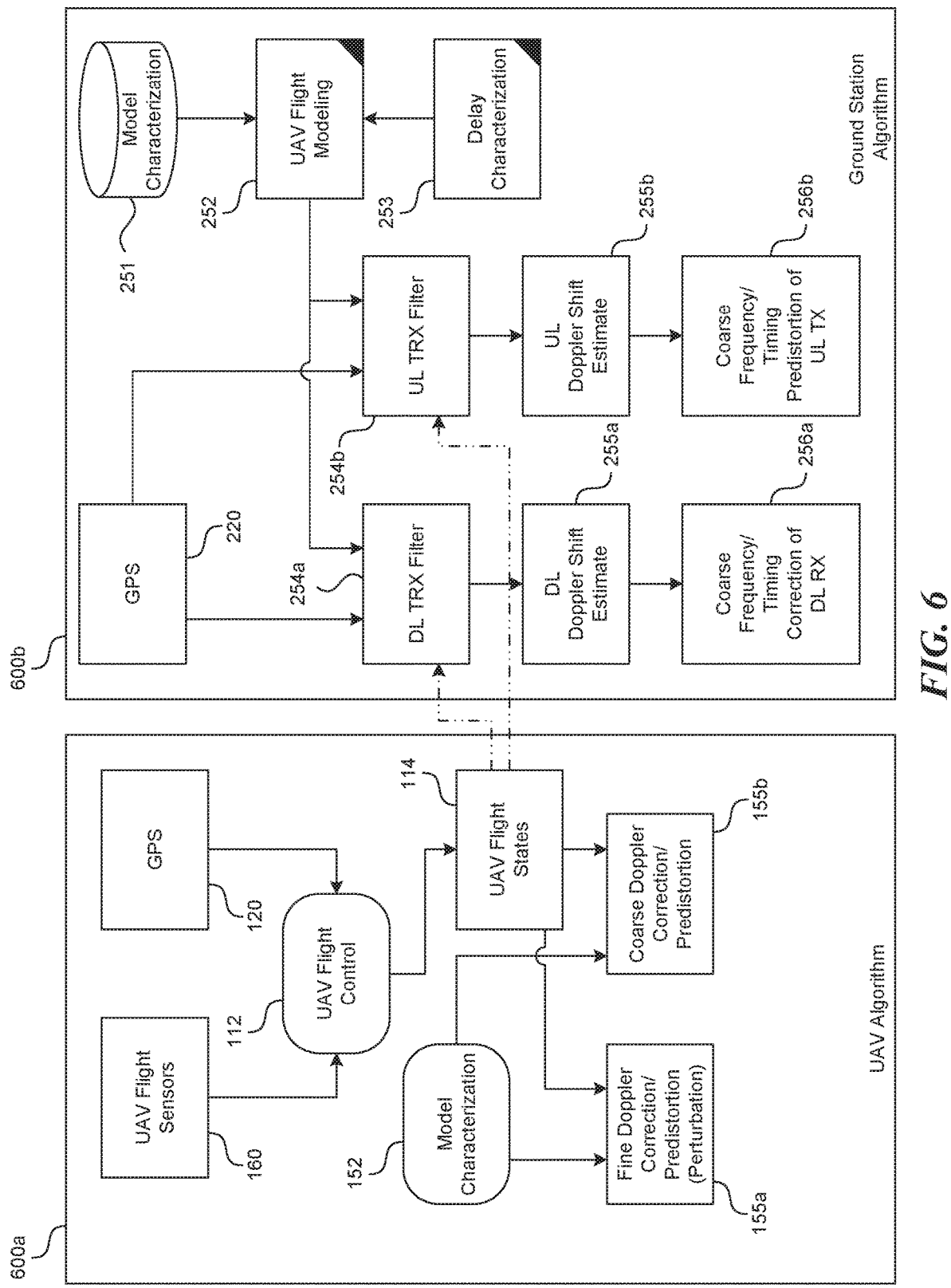
FIG. 6 is a schematic illustration of the UAV and ground station correction algorithms in accordance with an embodiment of the present technology.

FIG. 6 is a schematic illustration of a UAV correction algorithm 600a and a ground station correction algorithm 600b in accordance with an embodiment of the present technology. In some embodiments, a UAV Flight Modeling algorithm 252 provides estimates of the UAV flight trajectory and/or velocity. These estimates can, for example, include near future predictions of the UAV trajectory and/or velocity based on the UAV position/velocity/acceleration. Furthermore, for modeling the UAV flight the UAV Flight Modeling algorithm 252 may rely on a Model Characterization algorithm 251 (e.g., characterizations of the past modeling results) and a Delay Characterization algorithm 253 (e.g., delay in the wireless signal propagating from the UAL to the ground station, delays in generating UAV flight status reports, delays in applying the correction at the TX or RX, etc.). In at least some embodiments, the output of the UAV Flight Modeling algorithm 252 can be used with transmit/receive (TRX) filters 254a (DL) and 254b (UL) to improve the Doppler shift estimates. For example, the DL TRX Filter 254a and/or the UL TRX Filter 254b may include input from the UAV Flight Status Report module 114 and the UAV Flight Modeling algorithm 252 to better estimate the UAV trajectory/velocity. In some embodiments, the DL/UL TRX Filters may include optimal signal filter, such as Kalman filters that recursively estimate the trajectory/velocity of the UAV. A person of ordinary skill would know other filters that can estimate the trajectory/velocity of the UAV. The estimates of the trajectory/velocity of the UAV can be provided to DL/UL Doppler Shift Estimate algorithms 255a/255b to calculate the corresponding Doppler shift estimates. In at least some embodiments, the Doppler shift estimates are the coarse estimates that do not include small perturbations in the wireless signal.

In some embodiments of the present technology, the Doppler frequency/timing shifts can also be calculated at the UAV. For example, the UAV Flight Control module 112 can receive inputs from the UAV Flight Sensors 160 (e.g., vibration, rotation of the UAV) and the GPS 120 (e.g., absolute position of the UAV) to control the flight of the UAV and to provide flight parameters to the UAV Flight Status module 114. Additionally, flight models, for example, past modeling results, can be characterized by a Model Characterization algorithm 152 that may include Kalman filter or other filters. Such characterization can include predictions of the future UAV trajectory (e.g., relatively short term predictions based on the Model Characterization that is based on past history of the UAV trajectory). Based on these inputs, a Fine Doppler Correction/Predistortion algorithm 155a can calculate required correction/predistortion that eliminates or reduces the fine (i.e., perturbation) Doppler shifts. The correction/predistortion of the perturbations in the wireless signal is described, for example, with reference to FIG. 5. Furthermore, a Coarse Doppler Correction/Predistortion algorithm 155b can calculate required correction/predistortion that eliminates or reduces the coarse Doppler shifts. Such elimination/reduction of the coarse Doppler shifts in the wireless signal is described, for example, with references to FIGS. 2 and 4 above. The coarse or fine (perturbation) correction/predistortion of the wireless signal is executed by suitable electronics. Some embodiments of the systems and methods for correction/predistortion of the wireless signal are described with reference to FIGS. 7A and 7B below.

Figure 7A:
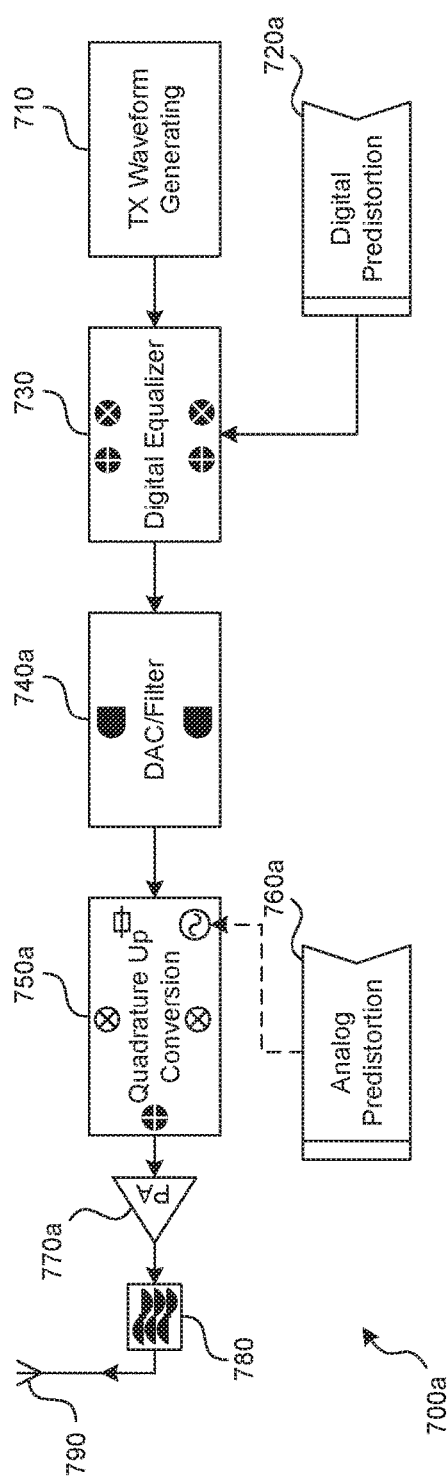
FIG. 7A is a schematic illustration of the digital and analog predistortion of the wireless signal emitted by the TX in accordance with an embodiment of the present technology.
Figure 7B:
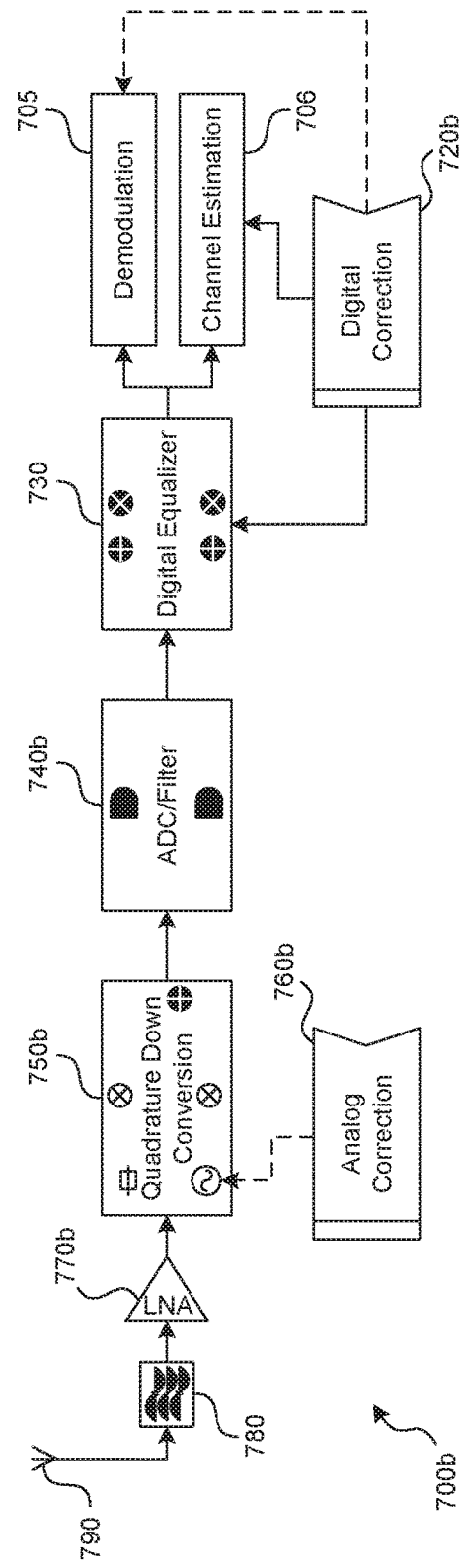
FIG. 7B is a schematic illustration of the digital and analog correction of the wireless signal received by the RX in accordance with an embodiment of the present technology.

FIGS. 7A and 7B are schematic illustrations of the digital and analog circuits that perform the Doppler correction/predistortion, respectively, of the wireless signal emitted by the TX or received by the RX in accordance with embodiments of the present technology. FIG. 7A illustrates a signal predistortion system 700a that can digitally and/or analogly predistort the wireless signal emitted by a TX of the ground station or the UAV. The system 700a can include a TX Waveform Generating module 710 capable of generating a UL wireless signal (at the ground station) or a DL wireless signal (at the UAV). As explained above, these wireless signals are subjected to the Doppler frequency and timing shifts when communicated from/to a UAV. To counteract the effects of the Doppler shifts, the TX waveforms can be predistorted by a Digital Predistortion module 720a and/or an Analog Predistortion module 760a such that, when received at the corresponding RX, the effects of the Doppler shifts of the wireless signal are eliminated or reduced. Signal predistortion can be calculated/estimated by the systems and methods described with reference to FIG. 6, In some embodiments, the digital predistortion can be applied at a Digital Equalizer module 730 that is capable of applying required predistortion on a per-frequency or a per-channel basis. A person of ordinary skill would know suitable digital filters that can apply predistortion on the, for example, per-channel basis. An example of such a digital equalizer is a Viterbi equalizer that minimizes a probability of an error in a signal sequence, Therefore, in at least some embodiments, the Digital Equalizer module 730 provides a stream of digital data that is digitally predistorted to account for the Doppler shifts. This stream of digital data can be converted to an analog wireless signal at a Digital to Analog Converter (DAC)/Filter module 740a. The resulting analog signal can be routed to a Quadrature Up Conversion module 750 where the analog channels can be converted from baseband frequencies to physical (RF) frequencies. In some embodiments, the Analog Predistortion module 760a can further predistort the analog channels to, for example, further reduce the Doppler shift of the wireless signal once it is received by the RX. A Power Amplifier 770a can amplify the analog signal to produce amplified signals 780 that are wirelessly sent by an antenna 790 to a corresponding RX.

Figure 11:
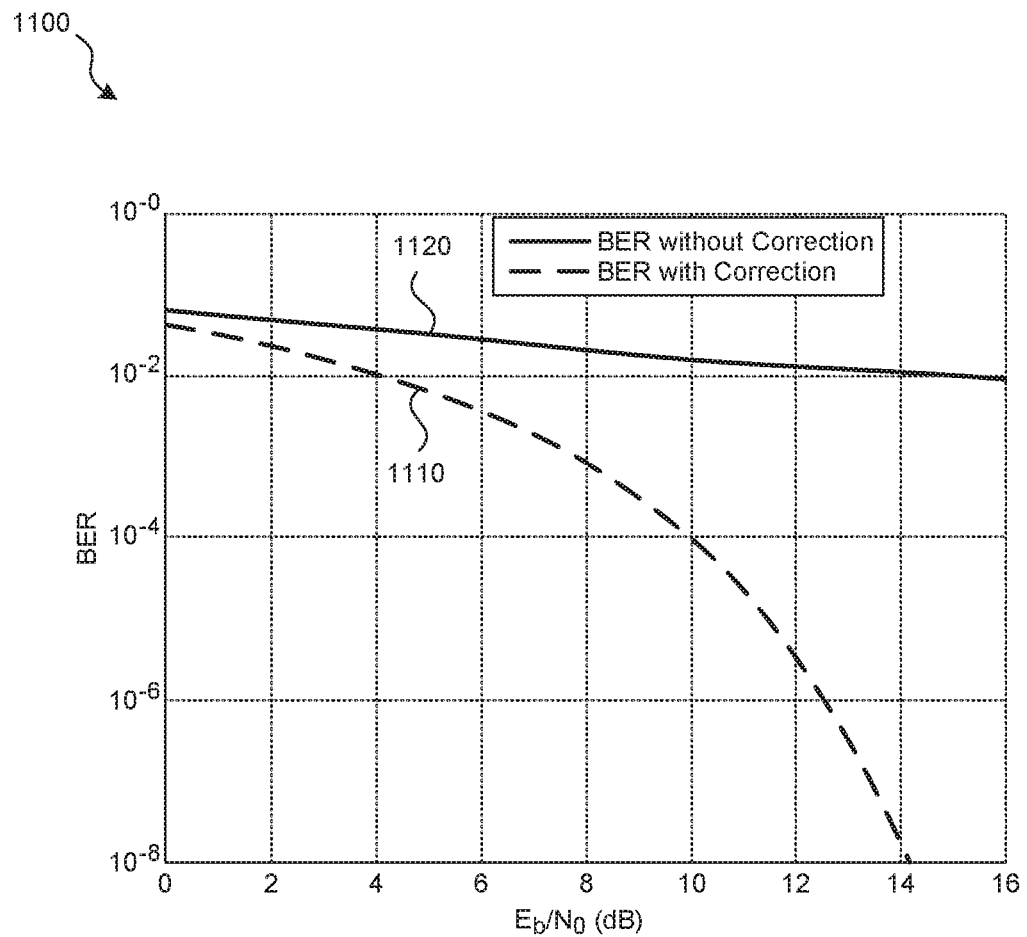
FIG. 11 is a graph of bit error rate (BER) with and without correcting the Doppler shift.

FIG. 7B illustrates a signal correction system 700b that can digitally and/or analogly correct the effects of the Doppler shift in a wireless signal received by an RX of the ground station or the UAV. Certain elements of the system 700b may be generally analogous to those of system 700a, and are not described in detail here. As explained above, the incoming wireless signal may include Doppler shifts because of the relative velocity of the UAV with respect to the ground station. The signal correction system 700b may eliminate or reduce the effects of the Doppler shifts by using, for example, the signal correction systems and methods described with reference to FIG. 6. In an embodiment of the inventive technology, the incoming wireless signal is received by the antenna 790 and is routed through a Low Noise Amplifier (LNA) 770b. An Analog Correction module 760b can apply the analog correction at a Quadrature Down Conversion module 750, An Analog to Digital Converter (ADC)/Filter module 740b converts analog signal to digital signal, and may filter the signal. The Digital Equalizer module 730 receives the digital signal from the ADC/Filter module 740b. After the Digital Equalizer module 730 processes the digital signal, a Demodulation module 705 can demodulate the digital signal and a Channel Estimation module 705 can estimate an appropriate channel for the digital signal. In some embodiments of the technology, a Digital Correction module 720b can apply digital correction to the signal at the Digital Equalizer module 730, the Demodulation module 705, and/or Channel Estimation module 706. The digital correction can be performed using, for example, suitable digital signal processing (DSP) electronics. Therefore, the effects of the Doppler shifts are eliminated or reduced in the outgoing digital signal (e.g., routed per corresponding channels) resulting in an improved bit error ratio (BER) of the digital signal reduced from the received wireless signal. A sample result of such a reduction in the BER is shown in FIG. 11 below.

Figure 8A:
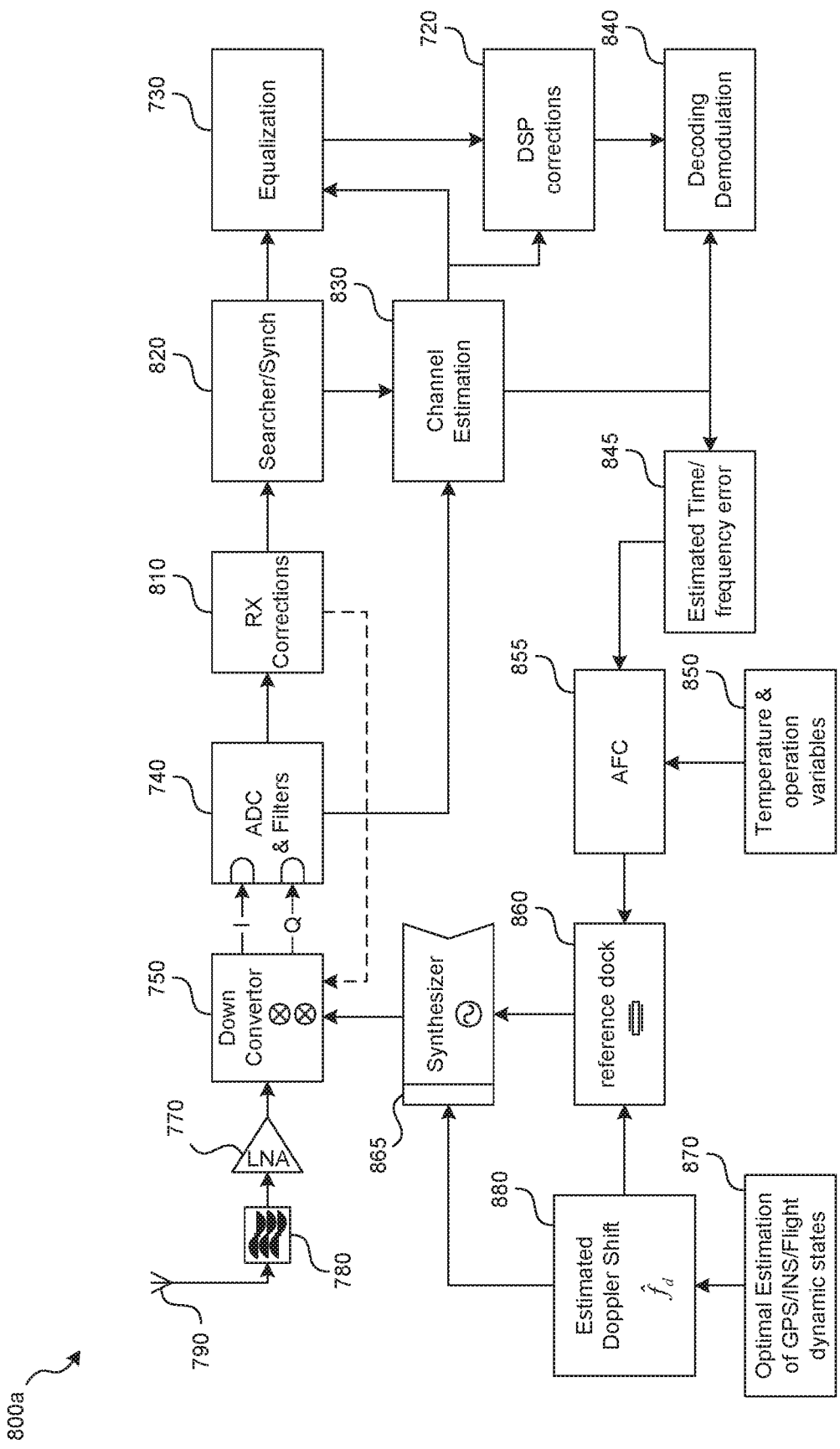
FIG. 8A is a schematic illustration of correction of the wireless signal at the ground station in accordance with an embodiment of the present technology.
Figure 8B:
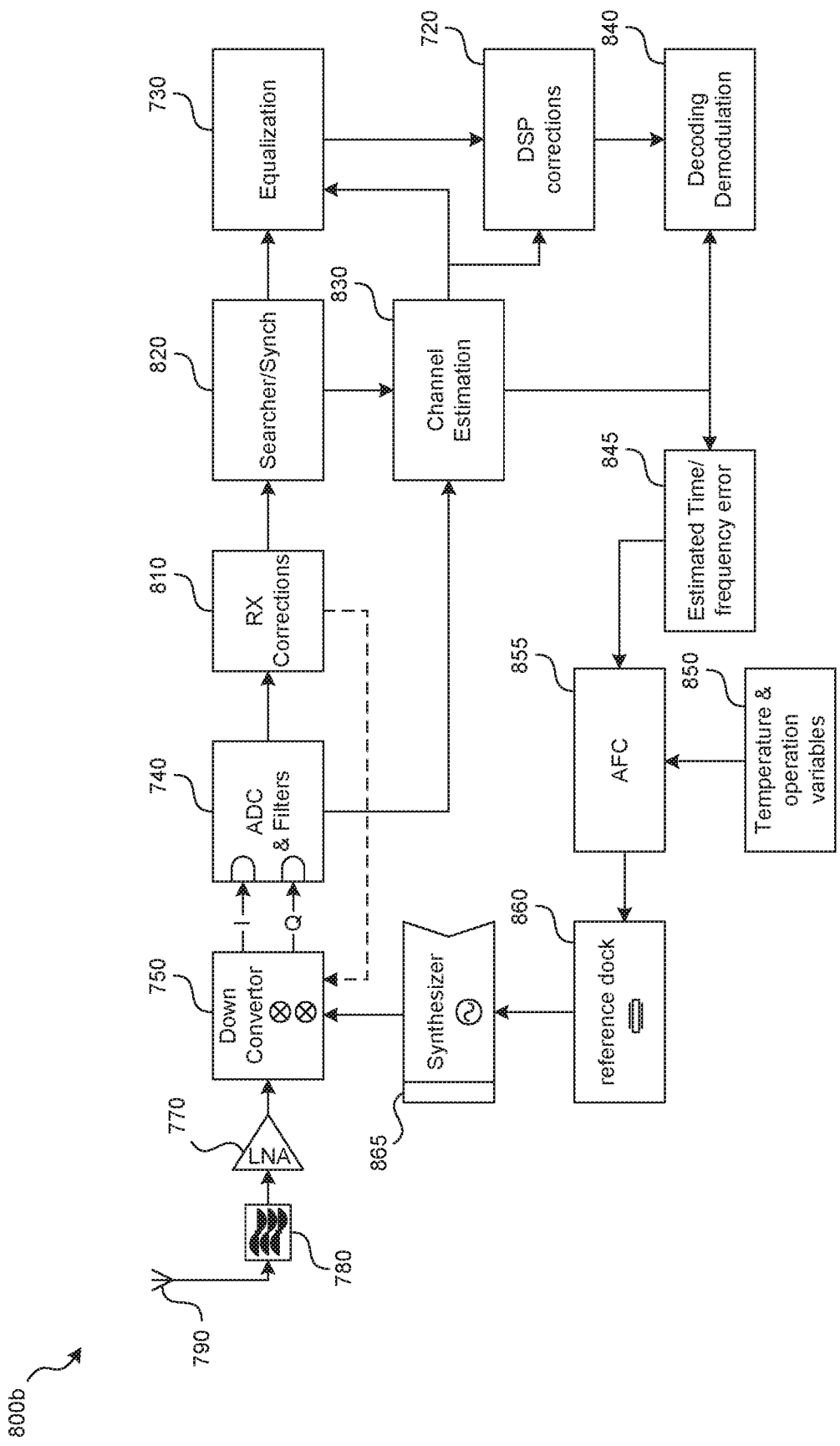
FIG. 8B is a schematic illustration of correction of the wireless signal at the UAV station in accordance with an embodiment of the present technology.

FIG. 8A schematically illustrates correction of the wireless signal at the ground station in accordance with an embodiment of the present technology. A correction schematics 800a includes down-converting the incoming wireless signal at the module 750, followed by A/D conversion and filtering the signal at the module 740. An initial RX correction can be performed at a module 810. The wireless signal can be passed through module 720 for DSP correction, followed by a module 840 for decoding demodulation. Searching/synchronizing is performed at module 820. A channel estimation Timing and/or frequency error can be estimated at a module 845. Next, an AFC module 855 provides wireless signal to a reference clock 860. An estimated Doppler shift is also provided to the reference clock 860 and to a synthesizer 865 by a module 880. The estimated Doppler shift can include optimal estimations provided by module 870. A synthesizer module 865 feeds the corrected wireless signal to the down-converter module 750, FIG. 8B schematically illustrates correction of the wireless signal at the UAV station in accordance with an embodiment of the present technology. In the illustrated embodiment, a correction schematics 800b includes elements that are generally analogous to those illustrated in the correction schematics 800a. However, the illustrated correction schematics 800b does not include the module 880 for estimating the Doppler shift and the module 870 for the optimal estimation. In at least some embodiments, the functions of the modules 870 and 880 can be executed at the ground station to reduce the weight of the UAV.

Figure 9:
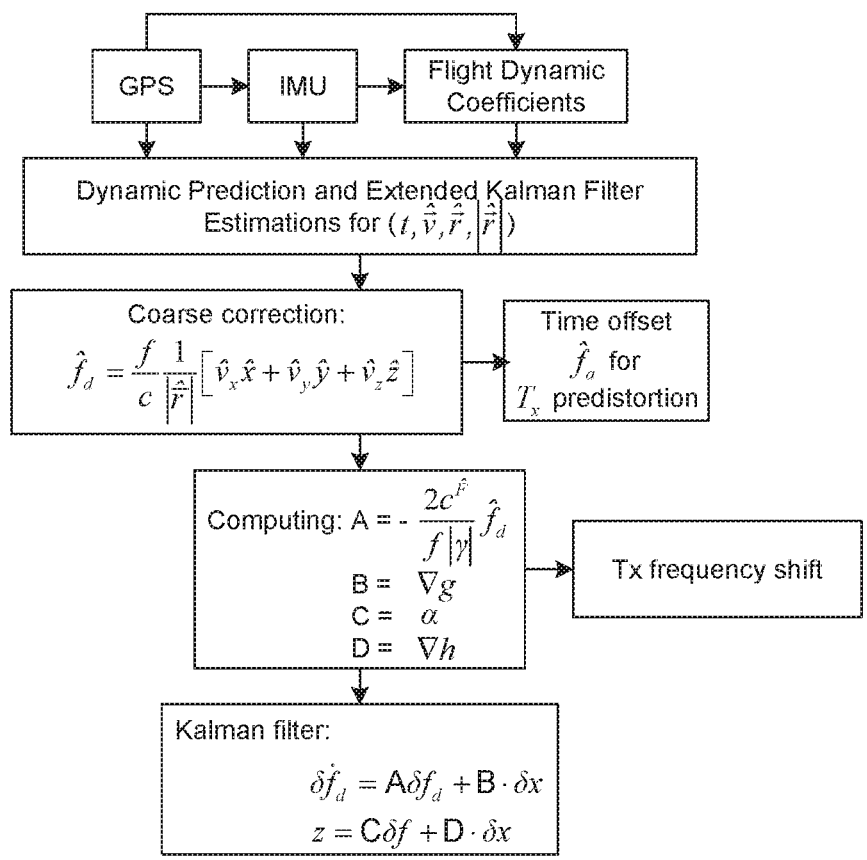
FIG. 9 is a flow diagram illustrating an embodiment of implementation of the Doppler shift correction.

FIG. 9 is a flow diagram illustrating an embodiment of implementation of the Doppler shift correction. The illustrated flow diagram can be implemented at the UAV and/or ground station using the electronics/software described in relation to FIGS. 2-8B above. Those having skills in the art will recognize that some process steps may be repeated, varied, omitted, or supplemented, and other (e.g., less important) aspects not shown may be readily implemented.

In some embodiments, for UAV in high maneuvering conditions changes of Doppler frequency shift with time can be estimated via dynamic recursively as:

$$\frac{df_d}{dt} = \frac{f}{c}\left[\frac{1}{|r|}(V_x^2 + V_y^2 + V_z^2 + \dot{V}_x x + \dot{V}_y y + \dot{V}_z z) - \right.$$  Eq. (1)

$$\frac{1}{|r|^3}(V_x x + V_y y + V_z z)^2 \Bigg]$$

where V represents velocity of the UAV, r represents distance between the TX and RX, and x, y and z are Cartesian coordinates.

Equation (1) can be also expressed as:

$$\dot{f}d = \frac{f}{c|r|}\Big[\|V\|^2 + \vec{V}\cdot\vec{r}\Big] + -\frac{c}{f|r|}f_d^2 = g(\dot{V}_x, \dot{V}_y, \dot{V}_z, V_x, V_y, V_z, xyz, f_d) \quad \text{Eq. (2)}$$

In general, the Doppler frequency shift changes non-linearly as a function of UAV position, velocity and acceleration. Linear perturbations of Doppler frequency shift can be calculated as:

$$\delta \dot{f}_d = \frac{2cf_d}{f|r|} \cdot \delta f_d + \nabla g \cdot \delta \bar{x}$$

where g represents gravitation acceleration and $\delta \bar{x}$ is a state vector of:

$$(\delta \dot{V}x, \delta \dot{V}y, \delta \dot{V}z, \delta V, \ldots, \delta x, \delta y, \delta z)$$

The order of the estimation models and corresponding parameters can be adjusted dynamically to adapt different UAV states. Doppler frequency shift predictions are impacted by:
(a) GPS, IMU time (e.g., time for the GPS, IMU signal to propagate),
(b) inaccuracies in the estimated initial position of the UAV,
(c) errors in the velocity estimates,
(d) errors caused by the local reference oscillators, and
(e) errors caused by multiple passes of the wireless signal from TX/RX to RX/TX.

In some embodiments, GPS and IMU calculations can be performed at ground station, and can be used for calculating Flight Dynamic Coefficients and to estimate Kalman Filter. Furthermore, coarse Doppler shift can be calculated and a time offset used for TX predistortion can be estimated. Coefficients A, B, C, and D for Kalman filter can be calculated and used for TX frequency shift. The coefficients A, B, C, and D can be used to estimate changes in Doppler frequency shift (coarse or perturbation) as shown in Eq. 3 below.

$$\delta \dot{f}_d = A\delta f_d + B \cdot \delta x \quad \text{Eq. (3)}$$

Figure 10:
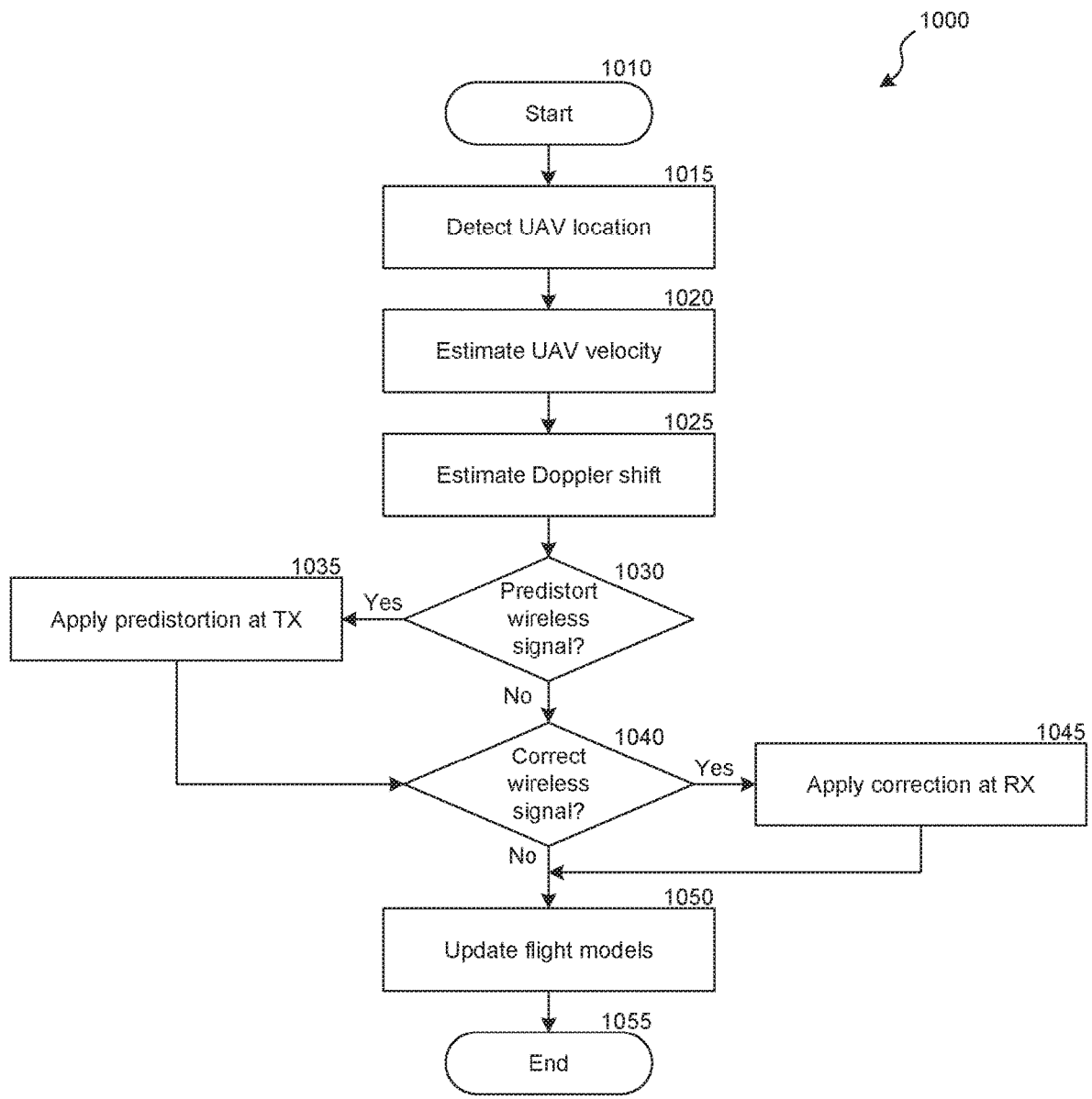
FIG. 10 is a flow diagram illustrating a method for correcting the Doppler shift.

FIG. 10 illustrates a flow diagram of a process flow 1000 for correcting the Doppler shift in accordance with an embodiment of the present technology. In general, the process flow 1000 is applicable for correcting the coarse and/or fine Doppler shifts. The routine 1000 can be performed by electronics and software described with reference to FIGS. 2-8B above. The process flow 1000 does not show all steps of correcting the Doppler shifts in the wireless signal, but instead provides an understanding of the process steps in some embodiments of the technology. Those having skills in the art will recognize that some process steps may be repeated, varied, omitted, or supplemented, and other (e.g., less important) aspects not shown may be readily implemented.

The process flow 1000 starts in block 1010. In block 1015 a location of the UAV is detected using, for example, one or more GPS, IMU units. In block 1020, a velocity of UAV can be estimated based on, for example, change of the location of the UAV over time (e.g., using a first derivative of the location over the time). A person of ordinary skill would know how to calculate/estimate the velocity of the UAV based on the GPS, IMU signal at the UAV.

Once the velocity of the UAV is estimated, in block 1025 a Doppler shift can be estimated. For example, the estimate of the Doppler shift can be based on a known location of the ground station and the estimated velocity (magnitude and direction) of the UAV. In some embodiments, the Doppler shift (e.g., frequency shift, timing shift) can be estimated using a Doppler Shift Estimator module 150.

In block 1030, a decision is made whether to predistort the wireless signal. If the wireless signal is to be predistorted, then in block 1035 the predistortion can be applied to the TX of the UAV and/or the TX of the ground station. The predistortion can be applied to the perturbation (fine) and/or coarse Doppler shift. In some embodiments, the predistortion can be applied using the UAV TX Predistortion module 142 or the Ground Station Predistortion module 232.

In block 1040, a decision is made whether to correct the wireless signal. If the wireless signal is to be corrected, then in block 1045 the correction can be applied to the RX of the ground station and/or the RX of the UAV. Some embodiments of the suitable hardware/software for the correction of the wireless signal are explained with reference to, for example, the UAV RX Perturbation Correction module 133, the UAV RX Correction module 131, the Ground Station RX Correction module 241, and the signal correction system 700b.

In block 1050, the flight models for the UAV are updated. As explained above, in some embodiment the flight models can be based on the applications of Kalman filter or other filters. The process flow 1000 for correcting/predistorting the wireless signal ends in block 1055, and may be started again in block 1010.

FIG. 11 is a graph of the BER with and without correcting the Doppler shifts. The horizontal axis represents a signal to noise energy ratio in decibel. The vertical axis represents the BER ranging from about $10^{-8}$ (in some applications, an acceptable BER) to about $10^{-1}$ (typically, an unacceptably high BER for most applications). A solid line 1120 corresponds to the BER without the correction applied, and a dash line 1110 corresponds to the BER with the correction applied. The BER generally decreases as the signal to noise ratio increases (i.e., in the direction of increased values on the horizontal axis). However, in the illustrated example, the BER with the correction applied (line 1110) decreases faster than the BER without the correction applied (line 1120). As a result, as the signal to noise ratio reaches about 14, the BER with correction drops to a value of about $10^{-8}$, while the BER without correction remains at about $10^{-2}$. In at least some practical applications, the BER of about $10^{-2}$ would be considered too high. The graph in FIG. 11 illustrates an application of the signal correction, but a generally analogous graph can be made for an application of the signal predistortion or for an application of the signal correction and predistortion.

From the foregoing, it will be appreciated that specific embodiments of the invention have been described herein for purposes of illustration, but that various modifications may be made without deviating from the spirit and scope of the various embodiments of the invention. For example, in some embodiments the wireless signals may be transmitted between two or more UAVs that are equipped with the predistortion/correction hardware and software. Furthermore, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

I claim:

1. A method comprising:
   receiving, at an unmanned aerial vehicle (UAV), data from an Inertial Measurement Unit (IMU) responsive to one or more of:
      vibrations of the UAV; or
      rotations of the UAV;
   determining, at the UAV based on the data received from the IMU, a fine perturbation of the UAV caused by a vibration or rotation of the UAV;
   calculating, at the UAV based at least in part on the fine perturbation of the UAV, a perturbation Doppler shift of a wireless signal to be transmitted from a transmitter (TX) of the UAV to a receiver (RX) of a ground station or an additional UAV;
   predistorting, at the UAV, the wireless signal before transmission from the TX of the UAV to reduce the perturbation Doppler shift at the RX of the ground station or the additional UAV; and
   transmitting the wireless signal from the TX of the UAV to the RX of the ground station or the additional UAV.

2. The method of claim 1, further comprising:
   predicting, at the ground station or the additional UAV, a past coarse trajectory of the UAV;
   computing, at the ground station or the additional UAV, an estimated coarse Doppler shift of the wireless signal based on the past coarse trajectory of the UAV; and
   correcting, at the ground station or the additional UAV, the wireless signal to reduce the estimated coarse Doppler shift.

3. The method of claim 2, further comprising reporting, from the UAV to the ground station or the additional UAV, at least one of:
   a location of the UAV;
   a velocity of the UAV; or
   an acceleration of the UAV, wherein the past coarse trajectory of the UAV is predicted based on one or more of the location, the velocity, or the acceleration.

4. The method of claim 3, wherein the past coarse trajectory of the UAV is predicted using a Kalman filter that recursively estimates the past coarse trajectory based on one or more of the location, the velocity, or the acceleration.

5. The method of claim 1, further comprising:
   predicting a future coarse trajectory of the UAV;
   computing, at the ground station, an additional estimated coarse Doppler shift of an additional wireless signal based on the future coarse trajectory of the UAV;
   predistorting, at the ground station, the additional wireless signal to reduce the additional estimated coarse Doppler shift at a receiver (RX) of the UAV;
   transmitting the additional wireless signal from a transmitter (TX) of the ground station to the RX of the UAV.

6. The method of claim 5, further comprising reporting, from the UAV to the ground station or the additional UAV, at least one of:
   a location of the UAV;
   a velocity of the UAV; or
   an acceleration of the UAV, wherein the future coarse trajectory of the UAV is predicted based on one or more of the location, the velocity, or the acceleration.

7. The method of claim 6, wherein the future coarse trajectory of the UAV is predicted using a Kalman filter that recursively estimates the future coarse trajectory based on one or more of the location, the velocity, or the acceleration.

8. The method of claim 5, further comprising:
   receiving, at the UAV, additional data from the IMU;
   determining, at the UAV based on the data received from the IMU, an additional fine perturbation of the UAV caused by an additional vibration or rotation of the UAV;
   calculating, at the UAV, an additional perturbation Doppler shift of the additional wireless signal based at least in part on the additional fine perturbation of the UAV; and
   correcting, at the UAV, the additional wireless signal to reduce the additional perturbation Doppler shift.

9. A system comprising:
   an unmanned aerial vehicle (UAV) comprising:
      a transmitter (TX) configured to transmit wireless signals from the UAV to a receiver (RX) of a ground station;
      an Inertial Measurement Unit (IMU) responsive to one or more of:
         vibrations of the UAV; or
         rotations of the UAV;
      a perturbation detection module configured to determine, based on data received from the IMU, a fine perturbation of the UAV caused by a vibration or rotation of the UAV;
      a Doppler-shift estimator configured to calculate, based at least in part on the fine perturbation of the UAV, a perturbation Doppler shift of a wireless signal to be transmitted from the TX of the UAV to the RX of the ground station; and
      a predistorting module configured to predistort the wireless signal before transmission from the TX of the UAV to reduce the perturbation Doppler shift at the RX of the ground station; and
   the ground station comprising:
      the RX configured to receive wireless signals from the UAV;
      an additional Doppler-shift estimator configured to:
         predict a past coarse trajectory of the UAV; and
         compute an estimated coarse Doppler shift of the wireless signal based on the past coarse trajectory of the UAV; and
      a RX correction module configured to correct the wireless signal to reduce the estimated coarse Doppler shift.

10. The system of claim 9, wherein:
    the UAV further comprises a flight status module configured to report, from the UAV to the ground station, at least one of:
       a location of the UAV;
       a velocity of the UAV; or
       an acceleration of the UAV; and the additional Doppler-shift estimator is configured to predict the past coarse trajectory of the UAV based on one or more of the location, the velocity, or the acceleration.

11. The system of claim 10, wherein the additional Doppler-shift estimator is configured to predict the past coarse trajectory of the UAV using a Kalman filter that recursively estimates the past coarse trajectory based on one or more of the location, the velocity, or the acceleration.

12. The system of claim 9, wherein:
the ground station further comprises:
an additional TX; and
an additional predistorting module;
the UAV further comprises:
an additional RX; and
an additional RX correction module;
the additional Doppler-shift estimator of the ground station is further configured to:
predict a future coarse trajectory of the UAV; and
compute an additional estimated coarse Doppler shift of an additional wireless signal based on the future coarse trajectory of the UAV;
the additional predistorting module of the ground station is configured to predistort the additional wireless signal to reduce the estimated additional coarse Doppler shift at the additional RX of the UAV;
the additional TX of the ground station is configured to transmit the additional wireless signal from the ground station to the additional RX of the UAV;
the perturbation detection module is further configured to determine an additional fine perturbation of the UAV caused by an additional vibration or rotation of the UAV;
the Doppler-shift estimator of the UAV is further configured to calculate an additional perturbation Doppler shift of the additional wireless signal based at least in part on the additional fine perturbation of the UAV; and
the additional RX correction module is configured to correct the additional wireless signal to reduce the additional perturbation Doppler shift.

13. The system of claim 12, wherein:
the UAV further comprises a flight status module configured to report, from the UAV to the ground station, at least one of:
a location of the UAV;
a velocity of the UAV; or
an acceleration of the UAV; and
the additional Doppler-shift estimator is configured to predict the future coarse trajectory of the UAV based on one or more of the location, the velocity, or the acceleration.

14. The system of claim 13, wherein the additional Doppler-shift estimator is configured to predict the future coarse trajectory of the UAV using a Kalman filter that recursively estimates the future coarse trajectory based on one or more of the location, the velocity, or the acceleration.

15. A system comprising:
an unmanned aerial vehicle (UAV) comprising:
a transmitter (TX) configured to transmit wireless signals from the UAV to a receiver (RX) of an additional UAV;
an Inertial Measurement Unit (IMU) responsive to one or more of:
vibrations of the UAV; or
rotations of the UAV;
a perturbation detection module configured to determine, based on data received from the IMU, a fine perturbation of the UAV caused by a vibration or rotation of the UAV;
a Doppler-shift estimator configured to calculate, based at least in part on the fine perturbation of the UAV, a perturbation Doppler shift of a wireless signal to be transmitted from the TX of the UAV to the RX of the additional UAV;
a predistorting module configured to predistort the wireless signal to reduce the perturbation Doppler shift at the RX of the additional UAV; and
the additional UAV comprising:
the RX configured to receive wireless signals from the UAV;
an additional Doppler-shift estimator configured to:
predict a past coarse trajectory of the UAV; and
compute an estimated coarse Doppler shift of the wireless signal based on the past coarse trajectory of the UAV; and
a RX correction module configured to correct the wireless signal to reduce the estimated coarse Doppler shift.

16. The system of claim 15, wherein:
the UAV further comprises a flight status module configured to report, from the UAV to the additional UAV, at least one of:
a location of the UAV;
a velocity of the UAV; or
an acceleration of the UAV; and
the additional Doppler-shift estimator is configured to predict the past coarse trajectory of the UAV based on one or more of the location, the velocity, or the acceleration.

17. The system of claim 16, wherein the additional Doppler-shift estimator is configured to predict the past coarse trajectory of the UAV using a Kalman filter that recursively estimates the past coarse trajectory based on one or more of the location, the velocity, or the acceleration.

18. The system of claim 15, wherein:
the additional UAV further comprises:
an additional TX; and
an additional predistorting module;
the UAV further comprises:
an additional RX; and
an additional RX correction module;
the additional Doppler-shift estimator of the additional UAV is further configured to:
predict a future coarse trajectory of the UAV; and
compute an additional estimated coarse Doppler shift of an additional wireless signal based on the future coarse trajectory of the UAV;
the additional predistorting module of the additional UAV is configured to predistort the additional wireless signal to reduce the estimated additional coarse Doppler shift at the additional RX of the UAV;
the additional TX of the additional UAV is configured to transmit the additional wireless signal from the additional UAV to the additional RX of the UAV;
the perturbation detection module is further configured to determine an additional fine perturbation of the UAV caused by an additional vibration or rotation of the UAV;
the Doppler-shift estimator of the UAV is further configured to calculate an additional perturbation Doppler shift of the additional wireless signal based at least in part on the additional fine perturbation of the UAV; and the additional RX correction module is configured to correct the additional wireless signal to reduce the additional perturbation Doppler shift.

19. The system of claim 18, wherein:
the UAV further comprises a flight status module configured to report, from the UAV to the additional UAV, at least one of:
a location of the UAV;
a velocity of the UAV; or
an acceleration of the UAV; and
the additional Doppler-shift estimator is configured to predict the future coarse trajectory of the UAV based on one or more of the location, the velocity, or the acceleration.

20. The system of claim 19, wherein the additional Doppler-shift estimator is configured to predict the future coarse trajectory of the UAV using a Kalman filter that recursively estimates the future coarse trajectory based on one or more of the location, the velocity, or the acceleration.

* * * * *